US008230565B2

(12) United States Patent
Klein et al.

(10) Patent No.: US 8,230,565 B2
(45) Date of Patent: Jul. 31, 2012

(54) TOOL

(75) Inventors: Dieter Klein, Friedrichshafen (DE); Dietmar Kurfeld, Steisslingen (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 0 days.

(21) Appl. No.: 13/099,441

(22) Filed: May 3, 2011

(65) Prior Publication Data

US 2011/0203087 A1 Aug. 25, 2011

Related U.S. Application Data

(63) Continuation of application No. 12/080,441, filed on Apr. 3, 2008, now abandoned.

(30) Foreign Application Priority Data

May 30, 2007 (DE) ........................ 2 2007 007 683 U

(51) Int. Cl.
*B23P 19/04* (2006.01)

(52) U.S. Cl. ................................ 29/239; 29/240; 29/242

(58) Field of Classification Search .................... 29/239, 29/240, 242
See application file for complete search history.

(56) References Cited

U.S. PATENT DOCUMENTS

| | | | | |
|---|---|---|---|---|
| 3,071,849 | A | 1/1963 | Krohm | |
| 4,425,681 | A | 1/1984 | Ilius | |
| 4,518,138 | A | 5/1985 | Stutenkemper et al. | |
| 4,700,478 | A * | 10/1987 | Mezger et al. | 30/294 |
| 6,874,218 | B2 * | 4/2005 | Hicks et al. | 29/450 |
| 6,959,473 | B1 * | 11/2005 | Anibas | 29/239 |
| 2007/0031198 | A1 | 2/2007 | Silva | |

FOREIGN PATENT DOCUMENTS

| | | |
|---|---|---|
| DE | 924438 | 1/1955 |
| DE | 19750095 | 5/1999 |
| DE | 20307019 | 8/2003 |
| JP | 59120564 | 8/1984 |

* cited by examiner

*Primary Examiner* — Lee D Wilson
*Assistant Examiner* — Shantese McDonald
(74) *Attorney, Agent, or Firm* — Tarolli, Sundheim, Covell & Tummino LLP

(57) ABSTRACT

A tool is proposed to assist detachment of an apparatus which has a housing adhering flatly on a pane, particularly of a sensor on the front windscreen of a vehicle, in which the apparatus housing has a surface with an exposed edge spaced from the pane. The tool has the form of a lug which has at least one engagement member on one longitudinal end, which engagement member can be engaged on the exposed edge of the apparatus and is provided with an opening or recess for a lever tool at a longitudinal distance from the engagement member. The tool is applied to the apparatus by engaging the engagement member behind the exposed edge on the apparatus housing. Then the lever tool, e.g. a simple bar or a screwdriver, is pushed through the opening or recess and is applied to bear on the top of the apparatus housing. The free end of the lever is then slowly raised, thereby lifting the housing off the pane.

18 Claims, 3 Drawing Sheets

2. Applying the tool between sensor and holding frame

TOOL

CROSS-REFERENCES TO RELATED APPLICATIONS

This application is a Continuation of U.S. patent application Ser. No. 12/1080,441, filed Apr. 3, 2008 now abandoned, which claims priority to German Patent Application No. 20 2007 007 683.5, filed May 30, 2007. The present application claims priority to the aforementioned patent applications, which are incorporated in their entirety herein by reference for all purposes.

BACKGROUND OF THE INVENTION

The present invention relates to a tool to assist detachment of an apparatus which has a housing adhering flatly on a pane, particularly of a sensor on the front windscreen of a vehicle.

Apparatus such as rain sensors, often combined as rain/light sensors, are pressed onto the inner surface of the front windscreen of a vehicle with the interposition of a transparent elastic coupling layer. This coupling layer, which consists for example of a silicone material, adheres both to the pane and also to the coupling surface of the sensor after a certain period of time. When a damaged front windscreen is exchanged, the sensor can only be re-used when it can be successfully detached, undamaged, from the front windscreen. However, the exchange of a damaged sensor is also difficult and work-intensive, if the coupling layer is torn off during detachment from the front windscreen.

SUMMARY OF THE INVENTION

The invention provides a simple tool by which the detachment of the sensor from the front windscreen can take place in a gentle manner.

The tool according to the invention is intended to assist detachment of an apparatus which has a housing adhering flatly on a pane, particularly of a sensor on the front windscreen of a vehicle, in which the apparatus housing has a surface with an exposed edge spaced from the pane. The tool has the form of a lug which has at least one engagement member on one longitudinal end, which engagement member can be engaged on the exposed edge of the apparatus and is provided with an opening or recess for a lever tool at a longitudinal distance from the engagement member. The tool is applied to the apparatus by engaging the engagement member behind the exposed edge on the apparatus housing. Then the lever tool, e.g. a simple bar or a screwdriver, is pushed through the opening or recess and is applied to bear on the top of the apparatus housing. The free end of the lever is then slowly raised. The lever movement is transferred as traction onto the lug, whereby the adjacent end of the apparatus is lifted from the pane. By further lifting of the lever end, the apparatus is then increasingly tilted about its edge, which is still lying on the pane, and in so doing is detached from the pane.

A particularly advantageous embodiment is suitable for a rain/light sensor, which is mounted by means of a holding frame fastened to the pane. Here, the holding frame surrounds the sensor housing, forming a narrow gap encircling the housing. The tool is now constructed so that the engagement member forms an elastic latching tongue at the end of the lug. The lug is introduced with the latching tongue perpendicularly to the pane into the encircling gap, until the latching tongue engages under the exposed edge on the sensor housing with a latching noise which can be clearly noticed. The tool is now thereby held securely in its engagement position and is also guided in its movement by the gap.

DETAILED DESCRIPTION OF PREFERRED EMBODIMENT

Further features and advantages will become apparent from the following description by means of the enclosed drawings, in which.

Figure 1:
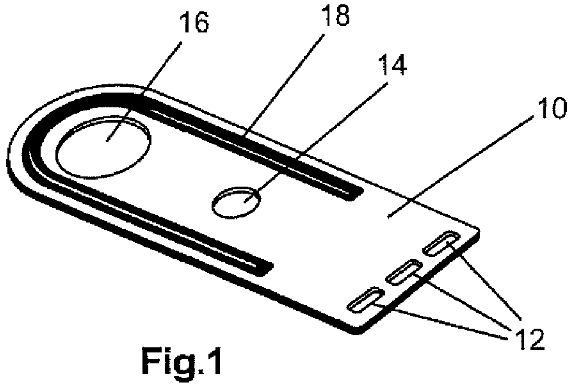
FIG. 1 shows a diagrammatic perspective view of the tool.
Figure 2:
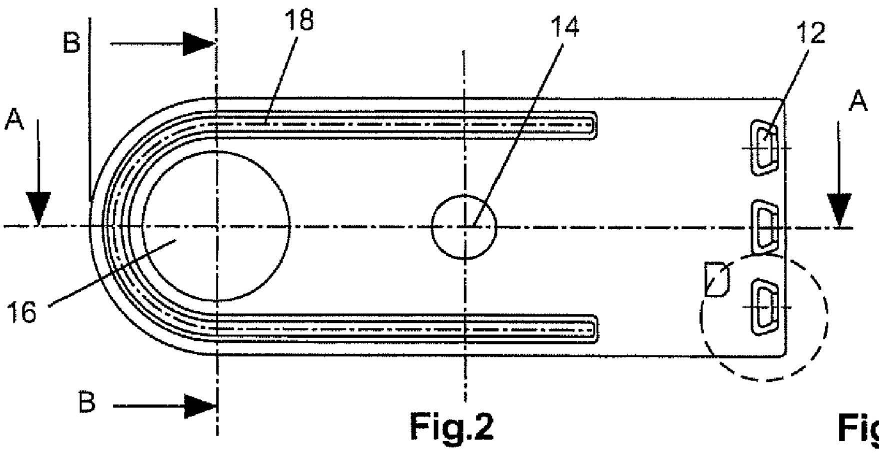
FIG. 2 shows a top view of the tool.
Figure 3:
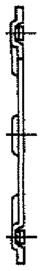
FIG. 3 shows a sectional view along line B-B in FIG. 2.
Figure 4:
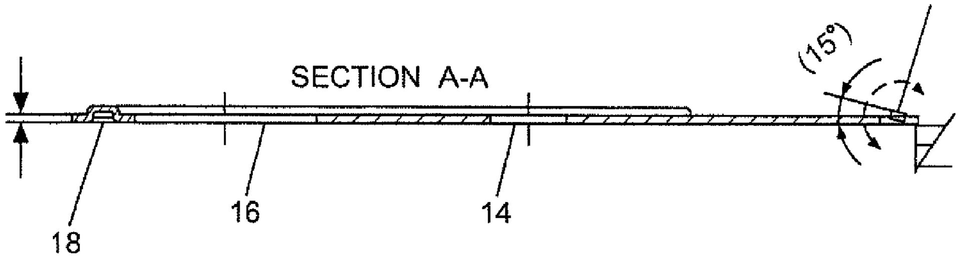
FIG. 4 shows a sectional view along line A-A in FIG. 2.
Figure 5:
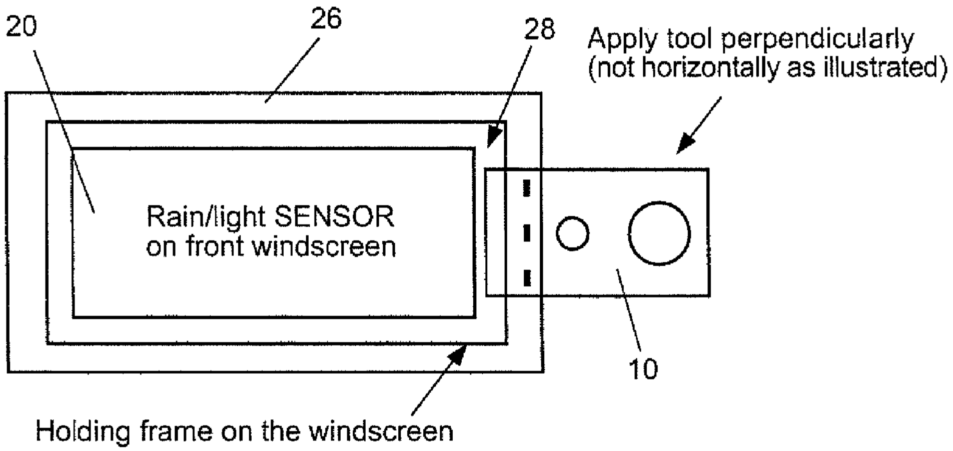
FIGS. 5 to 8 show diagrammatic views to illustrate the use of the tool.
Figure 6:
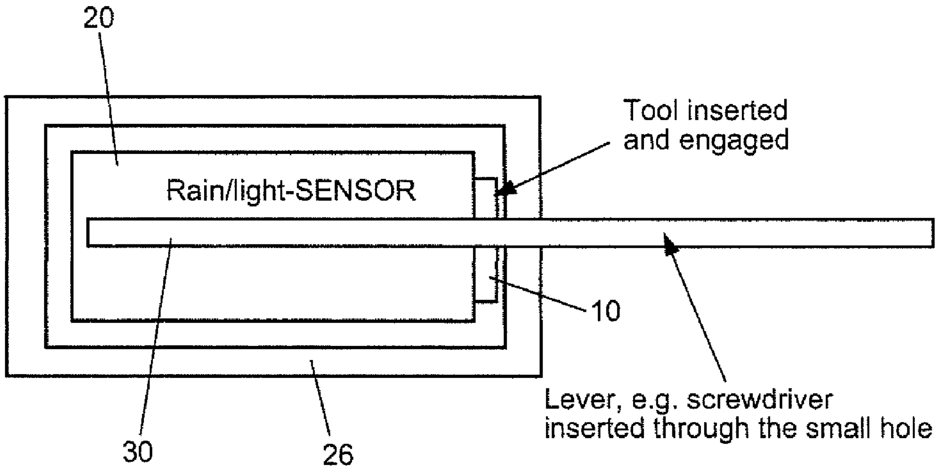

The tool 10 shown in the figures is a punched sheet metal part in the form of a flat, elongated lug. On one longitudinal end of the lug body, the tool has three latching tongues 12, punched free therefrom and angled at an angle of approximately 15°, and also has a small round hole 14 approximately in the centre between the two longitudinal ends. At the other longitudinal end, the lug body has a larger round hole 16, which forms a gripping opening. A reinforcing beading 18 is stamped along the outer periphery of the lug body over a region which is spaced apart from the latching tongues.

The tool is particularly suitable for assisting the detachment of a rain sensor or rain/light sensor from the front windscreen of a vehicle, as will now be described in further detail with reference to FIGS. 5 to 8.

In FIGS. 5 to 8, the sensor is illustrated in simplified form with a parallelepiped-shaped sensor housing 20. With the interposition of a coupling layer 22 of a transparent silicone material, the sensor housing is pressed against the inner surface of the front windscreen 24 of a vehicle. In addition, a holding frame 26 is fastened, in particular glued, to the inner surface of the front windscreen 24. The holding frame 26 surrounds the sensor housing 20 and is separated therefrom by a small distance, so that a narrow gap 28 encircling the housing 20 is formed.

Figure 7:
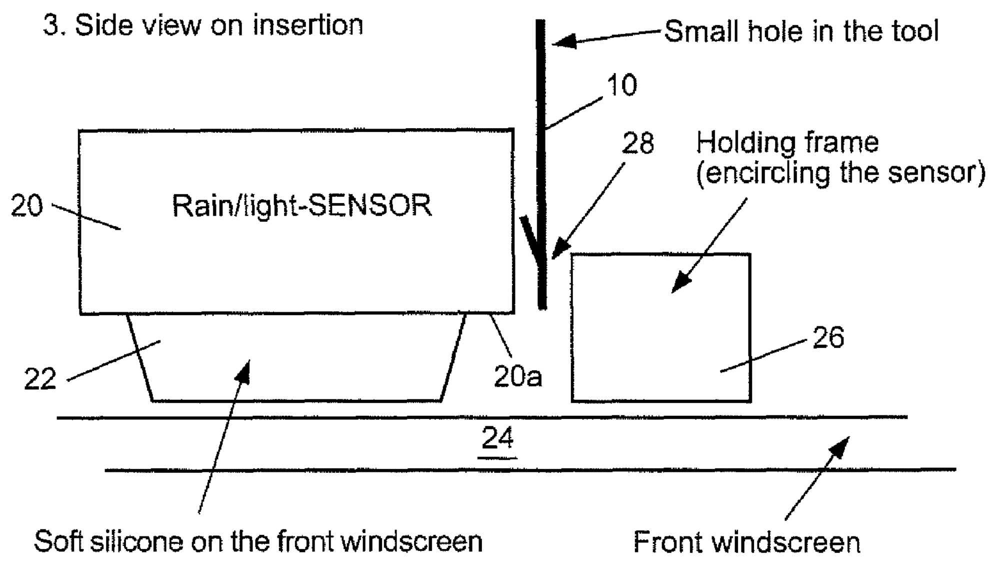

The tool 10 is now introduced into this gap 28 as shown in FIG. 7, i.e. in a direction perpendicular to the front windscreen 24 and facing the sensor housing 20 with the latching tongues. Whilst the latching tongues 12 penetrate into the narrow gap 28, they are bent back a little in the direction of the plane of the lug body. The sensor housing has an exposed edge 20*a* on its surface facing and slightly spaced from the front windscreen. If the tool 10 is now pushed deeper into the gap 28, then the latching tongues 12 finally engage behind the exposed edge 20*a* of the sensor housing 20. in so doing, the latching tongues spring back elastically into their angled position. At the same time, the end of the tool which is introduced into the gap 28 pushes against the surface of the front pane. Both procedures involve a clearly noticeable latching noise. The operator can now be certain that the tool is engaged in the gap 28 and the actual dismantling procedure can be commenced.

Figure 8:
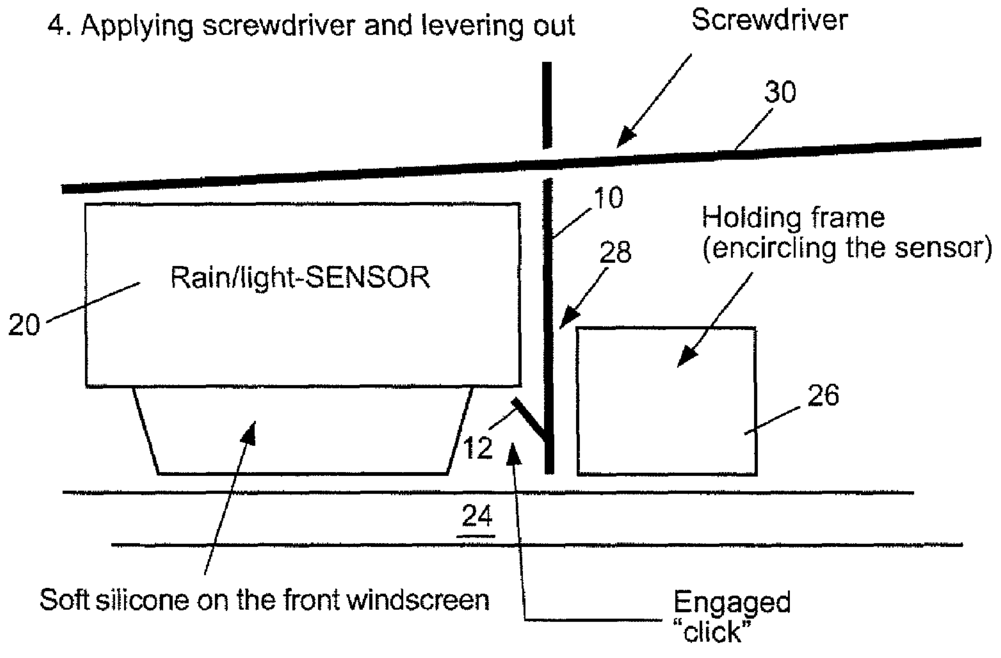

To do this, in the next step a simple lever tool 30 is pushed through the hole 14 of the tool 10. This may be a bar or else a screwdriver, which is able to be readily grasped. The end of the lever tool 30, which is pushed through the opening 14, is applied at the end of the sensor housing furthest away from the tool 10 to bear on its top, as shown in FIG. 8. Then the free end of the lever tool 30 is grasped and slowly lifted. The swivel movement of the lever tool 30 is converted into a traction which is transferred by the tool 10 onto the sensor housing 20 and allows the sensor housing to be lifted from the front windscreen 24. With the further upward movement of the lifting tool 30, the end of the sensor housing 20 adjacent to the tool 20 is released and this begins to swivel about its edge which is furthest away from the tool 10. In this way the apparatus is detached from the front windscreen 24 gently and without damage to the sensor housing 20 or to the coupling layer 22.

What is claimed is:

1. A method for removing an apparatus that has a housing adhering flatly on a pane, the housing having a surface facing the pane and slightly spaced from the pane and the surface having an exposed edge, the method comprising:

providing a tool having a longitudinal end on which at least one elastic latching element is arranged, the elastic latching element being bendable relative to the longitudinal end, the tool further including a body portion having an opening longitudinally spaced from the elastic latching element, the body portion further including a reinforcing beading extending along at least a part of the outer periphery of the body portion and spaced from the elastic latching element;

engaging the exposed edge of the housing surface with the elastic latching element, inserting a lever tool having a first end and a second end into the opening of the tool such that the first end of the lever tool engages the housing; and pivoting the second end of the lever tool relative to the first end in order to lift the housing away from the pane.

2. The method according to claim 1 wherein pivoting the second end of the lever tool relative to the first end causes the elastic latching element to pull the housing away from the pane.

3. The method according to claim 1 wherein an end of the housing closer to the second end of the lever tool is lifted away from the pane before an end of the housing closer to the first end of the lever tool is lifted away from the pane.

4. The method according to claim 1 further comprising:

forming the tool as a punched sheet metal part;

punching the latching element free from the body portion of the sheet metal part; and bending the latching element at an angle to the body portion of the sheet metal part.

5. The method according to claim 1 further comprising providing a gripping opening in a longitudinal end of the tool lying opposite the elastic latching element such that the opening for the lever tool is located between two opposed longitudinal ends of the tool.

6. The method according to claim 1 further comprising providing a portion in the reinforcing beading that extends transverse to a longitudinal direction of the body portion.

7. The method according to claim 1 further comprising providing the reinforcing beading with longitudinally extending portions and a transverse portion extending between the longitudinally extending portions and transverse to a longitudinal direction of the body portion.

8. The method according to claim 7 further comprising forming the reinforcing beading into a U-shape.

9. The method according to claim 1 further comprising forming the reinforcing beading to extend from a longitudinal end of the body portion opposite the elastic latching element toward the first longitudinal end of the body portion and past the opening.

10. A method for removing an apparatus that has a housing adhering flatly on a pane, the housing having a surface facing the pane and slightly spaced from the pane and the surface having an exposed edge, the method comprising:

providing a tool that has a body portion with first and second longitudinal ends, a latching tongue extends from the first longitudinal end at an angle and is deflectable toward the body portion, the tool further includes an opening spaced from the latching tongue, a reinforcing beading extends along an outer periphery of the body portion;

engaging the exposed edge of the housing with the latching tongue;

inserting a lever tool having a first end and a second end into the opening of the tool such that the first end of the lever tool engages the housing; and pivoting the second end of the lever tool relative to the first end in order to lift the housing away from the pane.

11. The method according to claim 10 wherein pivoting the second end of the lever tool relative to the first end causes the elastic latching element to pull the housing away from the pane.

12. The method according to claim 10 wherein an end of the housing closer to the second end of the lever tool is lifted away from the pane before an end of the housing closer to the first end of the lever tool is lifted away from the pane.

13. The method according to claim 10 further comprising providing a portion in the reinforcing beading that extends transverse to a longitudinal direction of the body portion.

14. The method according to claim 10 further comprising providing the reinforcing beading with longitudinally extending portions and a transverse portion extending between the longitudinally extending portions and transverse to a longitudinal direction of the body portion.

15. The method according to claim 14 further comprising forming the reinforcing beading into a U-shape.

16. The method according to claim 10 further comprising forming the reinforcing beading to extend from the second longitudinal end of the body portion toward the first longitudinal end of the body portion and past the opening that receives the lever tool.

17. The method according to claim 10 further comprising:

forming the first and second longitudinal ends of the body portion to extend in a plane, and forming the latching tongue and the reinforcing beading to extend out of the plane.

18. The method according to claim 10 further comprising forming a gripping opening in the second longitudinal end of the body portion such that the opening that receives the lever tool is located between the latching tongue and the gripping opening.

* * * * *